July 18, 1961 N. CAPELLARO ET AL 2,992,773

MULTIPLICATION MECHANISM FOR ADDING MACHINES

Filed April 15, 1959 2 Sheets-Sheet 1

INVENTORS
NATALE CAPELLARO
TERESIO GASSINO
BY
Kenyon & Kenyon
ATTORNEYS

July 18, 1961 N. CAPELLARO ET AL 2,992,773

MULTIPLICATION MECHANISM FOR ADDING MACHINES

Filed April 15, 1959 2 Sheets-Sheet 2

INVENTORS
NATALE CAPELLARO
TERESIO GASSINO

BY

Kenyon & Kenyon

ATTORNEYS

United States Patent Office 2,992,773

Patented July 18, 1961

2,992,773

MULTIPLICATION MECHANISM FOR ADDING MACHINES

Natale Capellaro and Teresio Gassino, Ivrea, Italy, assignors to Ing. C. Olivetti & C., S.p.A., Ivrea, Italy, a corporation of Italy Filed Apr. 15, 1959, Ser. No. 806,575

Claims priority, application Italy Apr. 17, 1958

13 Claims. (Cl. 235—60)

The present invention concerns adding machines and the like having a multidenominational indexing mechanism and adapted to effect multiplication by repeated additions and/or subtractions.

The known multiplication mechanisms provided to this end may be of two different classes. In a first class of mechanisms, known as automatic multiplication mechanisms, both a multidigit multiplicand and a multidigit multiplier are fully set up either in two different keyboards or in a single keyboard, the multiplication being effected automatically for all the multiplier digits. Where a single keyboard is used the multiplier is first set up in the indexing mechanism of the machine and then stored in a suitable multiplier storage device, whereas the multiplicand is kept stored in the indexing mechanism.

In the second class of multiplication mechanisms, known as of the semiautomatic type, each multiplier digit is singularly set up and calculated, a multiplication by a multidigit multiplier being thus divided into a number of multiplier digit set-up and calculation operators. Usually the multiplicand is set up in the indexing mechanism by means of the main keyboard of the machine, whereas each multiplier digit is set up in an independent multiplier setting device settable either by means of an auxiliary ten key keyboard or by means of a differential manipulative slide.

The primary object of the present invention is to provide in an adding machine or the like an improved multiplication mechanism of the semiautomatic type which is easily operated and wherein both the multiplicand and the multiplier are set up by means of the main keyboard of the machine.

Another object of the invention is to provide in such a machine a multiplication mechanism for a ten key adding machine wherein the multiplicand and a multiplier digit are sequentially set up in the conventional pin carriage.

A further object of the invention is to provide in such a machine a printing device adapted to print a multiplication symbol between the multiplicand and a multiplier digit.

Another object of the invention is to provide in such a machine a novel cycle counting device requiring no pawl to be stepwise returned to home position.

According to the invention, in an adding machine or the like comprising a cycling mechanism operable through a variable number of machine cycles, a multidenominational indexing mechanism settable according to a multidigit amount, a plurality of denominational actuators adapted to cooperate with the set denominations of said indexing mechanism for an amount entering operation, and back spacing means operable for shifting the cooperative relations of said plurality of actuators and said indexing mechanism one denomination toward the lower denominations of said plurality, we now provide the combination of a cycle counter cooperating with said indexing mechanism and settable under the control thereof according to the digit of the lowest denomination of said amount, and manipulative means for operating said back spacing means and for causing said cycle counter to be thereupon so set, said digit being a multiplier digit, the other digits of said amount representing a multiplicand.

Further objects, features and advantages of the invention will become apparent from the following description of a preferred embodiment thereof, taken in conjunction with the accompanying drawings, wherein.

Figure 1:
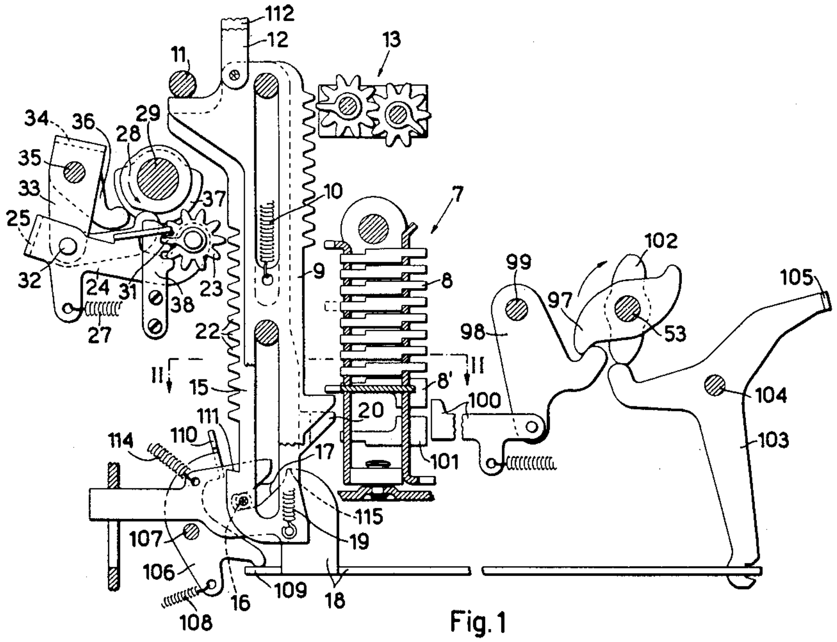
FIG. 1 is a left-hand longitudinal sectional view of a ten key listing adding machine embodying the multiplication mechanism according to the invention.
Figure 2:
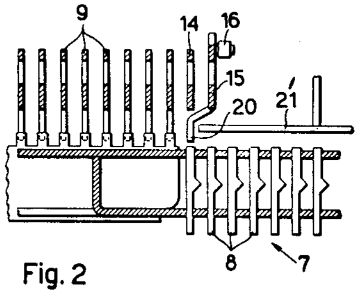
FIG. 2 is a horizontal sectional view taken on the line II—II of FIG. 1.

With reference to FIGS. 1 and 2, the numeral 7 generally indicates a multidenominational indexing mechanism such as a pin carriage denominationally settable according to a multidigit amount by means of a conventional ten-key keyboard not shown in the drawings. The numeral 9 indicates a plurality of longitudinal movable denominational actuators adapted to cooperate with the set denominations of the pin carriage 7 for an amount entering operation into a register 13.

During the set up operation of a multidigit amount which is effected beginning from the highest denominational digit thereof, the pin carriage 7 is stepwise advanced leftwards from the home position shown in FIG. 2, in order to bring the set up stop pins 8 such as that shown by broken lines in FIG. 1, into a cooperative relationship with the actuators 9. Said actuators are normally kept at rest by a conventional reciprocable universal bar 11 against the upward urged of a corresponding plurality of springs 10. Upon lifting the universal bar 11 each actuator 9 may sense the set stop pin 8 cooperating therewith and assume an upper position representing the digit of the corresponding denomination, whereby the amount set up in the pin carriage 7 may be printed by a plurality of digit printing members 12 associated with the actuators 9 and entered into the register 13.

Located on the right side of the plurality of actuators 9 and associated digit printing members 12 is the conventional symbol printing member actuator 14 (FIG. 2) associated with a symbol printing member which is adapted to print a symbol on the right side of an amount to indicate the type of operation effected in correspondence therewith.

The invention provides a cycle counter cooperating with the pin carriage 7 and settable according to the digit of the lowest denomination of a set amount. More particularly, said cycle counter comprises a cycle counter actuator 15 (FIGS. 1 and 2) adapted to cooperate with the lowest set denomination of the pin carriage 7 and having a multiplier printing member 112 associated therewith, said actuator 15 being located on the right side of the symbol printing member actuator 14. The cycle counter actuator 15 is mounted for longitudinal movement like the denominational actuators 9. Its lower end is provided with a roller 16 normally engaging a cam slot 17 of a first locking member such as a horizontal slide 18 locking the actuator in the position of rest shown in FIG. 1, against the urge of a spring 19. Said position of the actuator 15 is lower than the zero position defined by the universal bar 11 and will be called as a sub-zero position.

The actuator 15 is further provided with a sensing finger 20 distanced about one step from the zero stop pin 8′ of the pin carriage 7. The sensing finger 20 is located substantially in correspondence with the first settable denomination of the pin carriage 7, said finger lying in the vertical plane of the first left hand column of stop pins 8, 8', when the pin carriage 7 is in its rest position of FIG. 2. Since the symbol printing member actuator 14 is located between the denominational actuators 9 and the cycle counter actuator 15, the sensing finger 20 is suitably off-set leftwards from the actuator 15 as shown in FIG. 2.

The conventional stop pin zeroizing plate 21 is placed rear the stop pins 8 located on the right of the vertical plane of the sensing finger 20. At the end of each machine cycle the plate 21 is moved forwards to reset the set stop pins 8, 8' as will best be described hereinafter.

Figure 3:
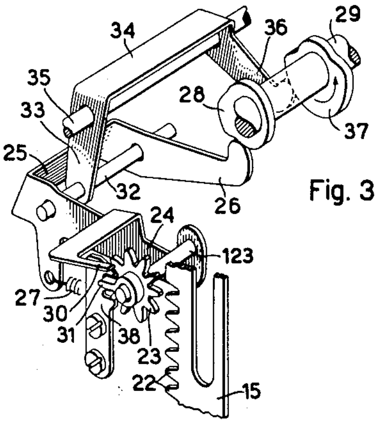
FIG. 3 is a perspective view of a detail of FIG. 1.

Finally, the cycle counter actuator 15 is provided with a rear toothed edge 22 adapted to cooperate with a cycle counting device, such as a pinion 23, comprised in said cycle counter and settable by said actuator according to the digit of said lowest denomination. The pinion 23 is rotatably mounted on a pivot 123 (FIG. 3) secured to one arm 24 of a bail 25. The arm 24 is provided with a stop element such as a bent lug 30 located in the vertical plane of a zero cam element such as a tooth 31 of the pinion 23 adapted to define the zero or home position of the pinion 23, the latter being settable from said home position to a rotated position according to a multiplier digit. By the urge of a spring 27 a second arm 26 of the bail 25 cooperates with a first element operable by the conventional cycling mechanism of the machine, such as with a cam 28 secured to the main shaft 29 cyclically driven by said cycling mechanism.

The bail 25 is fulcrumed on a pivot 32 secured to one arm 33 of a second bail 34 fulcrumed in turn on a stationary shaft 35. By the urge of the spring 27 a second arm 36 of the bail 34 cooperates with a second element such as a second cam 37 secured to the main shaft 29. Normally the bail 34 causes the pinion 23 to engage a stationary actuator such as a rack 38, the latter forming with the actuator 15 a pair of actuators diametrically opposed with respect to the pinion 23 and adapted to be alternately engaged thereby.

The tooth 31 of the pinion 23 is adapted to cooperate with a projection 39 of a lever 40 (FIG. 4) fulcrumed on a stationary pivot 41. The lever 40 is provided with a hooked arm 42 adapted to latch a bent lug 43 of a lever 44 pivoted at 45. The lever 44 is so controlled by a cam 46 of the main shaft 29 as to be rocked first counterclockwise and then clockwise twice during each full revolution of the shaft 29.

Linked to the lever 44 is a pawl 47 suitably guided by a vertical slot of a bent lug 48 of a lever 49 pivoted at 50. The pawl 47 is adapted to cooperate with a set of four pins 51 of one disk 52 secured to a shaft 53. Similarly secured to the shaft 53 is another disk 54 provided with a pair of diametrically opposed notches 55 and 56. A lug 57 of the lever 49 is urged by a spring 58 to normally engage one notch of said pair of notches 55 and 56, in the position of FIG. 4 the notch 55.

The lever 49 is further provided with another lug 59 adapted to cooperate with a hook 60 of a lever 61 pin-and-slot connected to a slide 62. A pin 64 provided on a manipulative means such as a multiplication key 65 is adapted to cooperate with an inclined notch 63 of the slide 62. As will be seen hereinafter the key 65 is adapted to initiate a multiplication operation. A spring 66 is tensioned between the lever 61 and the slide 62, another spring 67 urges the slide 62 toward the position of rest shown in FIG. 4.

The lever 61 is provided with a shoulder 68 cooperating with a lug 69 of a crank lever 70 adapted to start the cycling mechanism of the machine. More particularly, the crank lever 70, upon being rotated counterclockwise, closes the electric circuit of the motor, not shown in the drawings, and clutches the cycling mechanism of the machine to the motor to operate said mechanism through a variable number of machine cycles and thus to rotate the main shaft 29 through a variable number of full revolutions.

The lever 61 is urged by the spring 66 to normally contact a lug 71 of a lever 72 also pivoted at 50. The lever 72 is controlled by a cam 73 secured to the shaft 53 and is formed with a lug 74 adapted to cooperate with a projection 75 of the slide 62. When rotating the lever 72 clockwise its shoulder 76 is adapted to disable the conventional mechanism of the machine after completion of the operation of the printing members associated with the actuators 9, 14 and 15.

Further secured to the shaft 53 is a cam 77 (FIG. 5) cooperating with a lever 78 pivoted at 79. Upon rocking the lever 78 clockwise its lug 80 is adapted to set the conventional repeat mechanism of the machine in order to prevent the pin carriage 7 from being restored upon completion of a machine cycle.

Figures 4, 5, 6:
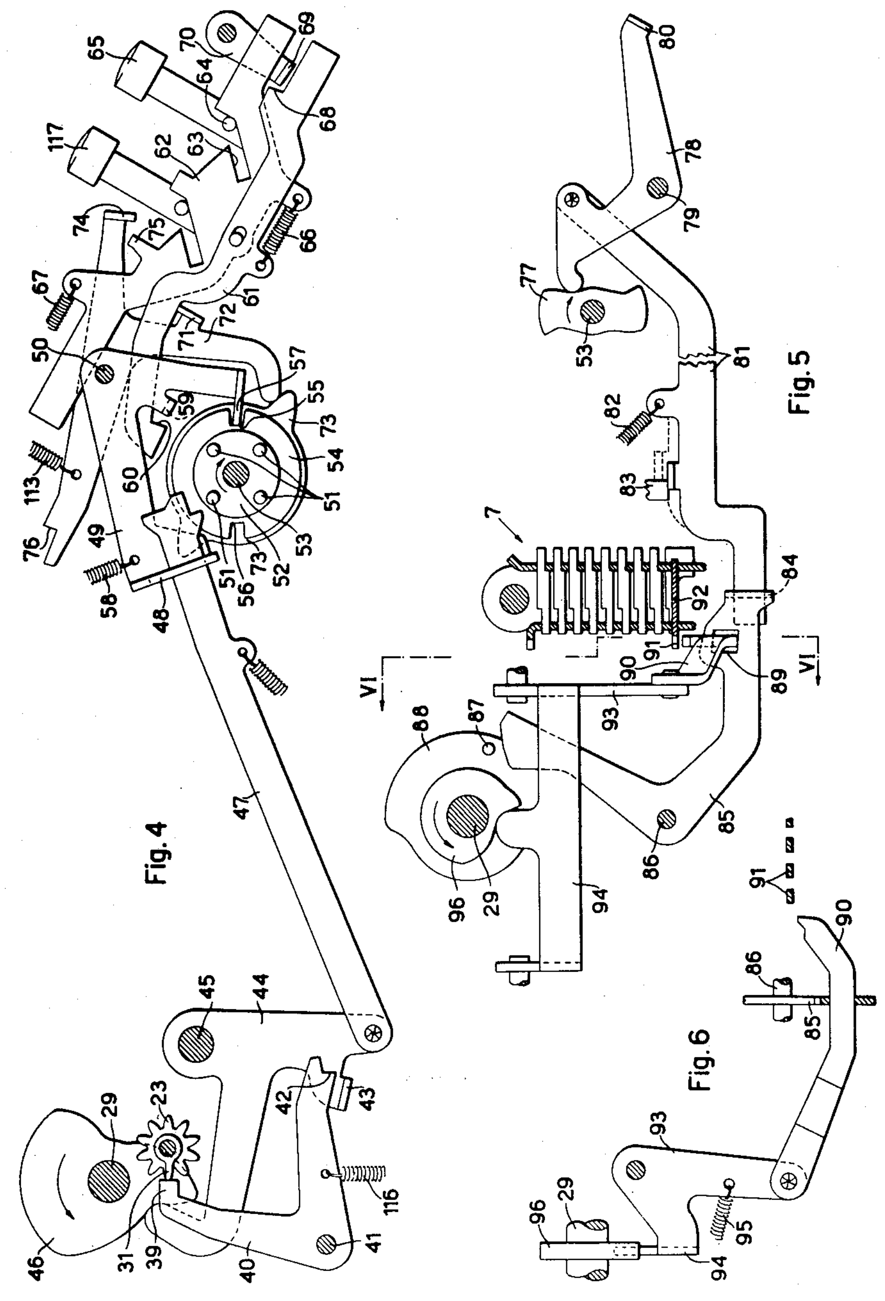
FIG. 4 is a second left-hand longitudinal sectional view of the machine.
FIG. 5 is a third left-hand longitudinal sectional view of the machine.
FIG. 6 is a frontal sectional view taken on the line VI—VI of FIG. 1.

Pivoted on the lever 78 is a link 81 urged by a spring 82 to normally contact a stationary arresting member 83. The link 81 is suitably guided by a vertical slot of a bent lug 84 of a lever 85 pivoted at 86 and operable by a pin 87 of a cam 88 secured to the main shaft 29. The lever 85 is formed with a slot 89 engaged by a spacing means such as a transverse back space pawl 90 (FIGS. 5 and 6) adapted to cooperate with the teeth 91 of a spacing rack 92 secured to the pin carriage 7. This back space pawl 90 is pivoted on an arm 93 of a bail 94 operable by a cam 96 of the main shaft 29 against the urge of a spring 95. It will be apparent that upon operation of the cam 96 the back space pawl 90 will shift the cooperative relationship of the plurality of actuators 9 and the pin carriage 7 one denomination toward the lower denominations of said plurality by back spacing the pin carriage 7 one space to the right as seen in FIGS. 2 and 6.

Secured to the shaft 53 is a further cam 97 (FIG. 1) controlling a lever 98 pivoted at 99 and linked to a push rod 100 located in the vertical plane of the first left hand column of stop pins 8, 8' when the pin carriage 7 is in its position of rest shown in FIG. 2. Upon rocking the lever 98 clockwise the push rod 100 sets the juxtaposed zero stop pin 8' and a spacing stop pin 101, thus operating the conventional carriage escapement mechanism, not shown in the drawings, in order to advance the pin carriage 7 one space leftwards.

Secured to the shaft 53 is a last cam 102 controlling a lever 103 pivoted at 104 and formed with a lug 105. Upon rocking the lever 103 clockwise the lug 105 will cause the conventional register engaging and disengaging mechanism of the machine to mesh the register 13 with the actuators 9.

The lever 103 is linked to the slide 18 whose rear lug 109 controls a normally ineffective second locking member such as a lever 106 pivoted at 107. The lever 106 is formed with a bent lug 110 adapted to cooperate with a shoulder 111 of the actuator 15 and is urged clockwise by a spring 108.

The multiplication mechanism operates as follows.

By means of the ten-key keyboard first the multiplicand is denominationally set up in the pin carriage 7 beginning from the highest denominational digit of said multiplicand. Thereupon the lowest denominational digit of a multidigit multiplier is similarly set up in the pin carriage, whereby said two factors are stored in the pin carriage as a single multidigit amount whose lowest denomination represents a multiplier digit, while the other denominations thereof represent a full multiplicand, the pin carriage having thus accordingly been advanced a corresponding number of spaces from its rest position of FIG. 2.

Upon depressing the multiplication key 65 (FIG. 4), the pin 64 shifts the slide 62 forwards (rightwards in FIG. 4). The lever 61 follows the movement of the slide 62 and its hook 60 engages the lug 59 thus rocking the lever 49 counterclockwise and disengaging the lug 57 from the notch 55 of the disk 54. Moreover, the slotted lug 48 lowers the pawl 47 to enable same to engage the juxtaposed pin 51.

Simultaneously, the shoulder 68 of the lever 61 rocks the crank lever 70 to start the main shaft 29 for the first multiplication cycle, whereby its cam 46 rocks the lever 44 counterclockwise. The pawl 47 is now pushed forwards, thus engaging the pin 51, whereby the disk 52 and the shaft 53 will be rotated about 90 degrees clockwise. The disk 54 now locks the lever 49 in its rocked position.

Upon being rotated with the shaft 53 the cam 73 enables the lever 72 to be rocked clockwise by a spring 113. The lug 74 of the lever 72 is thus placed behind the projection 75 whereby the slide 62 is locked in the shifted position and, consequently the key 65 is locked in the depressed position.

Upon being rotated with the shaft 53 the cam 77 (FIG. 5) first rocks the lever 78 clockwise. By this movement the lug 80 of the lever 78 will set the repeat mechanism to prevent the pin carriage 7 from being restored at the end of the machine cycle. Moreover, the link 81 upon being shifted forwards (rightwards in FIG. 5) by the lever 78 will leave the lower edge of the arresting member 83 and be raised by the spring 82 until locked in the position shown with broken lines, whereby the lever 78 will be prevented from being restored by the spring 82 upon being released by the cam 77 during the latter portion of its 90 degrees revolution.

Upon being raised the link 81 rocks the lever 85 counterclockwise and raises the back space pawl 90 to enable same to engage the teeth 91 of the spacing rack 92, which due to the transverse advancement made by the pin carriage 7 when setting up the multiplicand and the multiplier digit has been shifted leftwards with respect to the position of FIG. 6.

The cam 96 (FIG. 5) of the main shaft 29 will now rock the bail 94 counterclockwise (FIG. 6) to cause the back space pawl 90 to back space the pin carriage 7 one space rightwards, whereby the set stop pin 8 of the lowest denomination set up in the pin carriage will be brought in the vertical plane of the sensing finger 20 of the cycle counter actuator 15 before the actuators 9 and 15 start their upward movement at the beginning of the first machine cycle. It will thus be apparent that upon depression of the multiplication key 65 the back space pawl 90 will be operated to restore the cooperative relationship of the plurality of actuators 9 and the pin carriage established after all the denominations of the single multidigit amount mentioned above but the lowest had been set up, whereby the multiplicand stored in the pin carriage 7 will correctly face the actuators 9.

Upon being rotated with the shaft 53 the cam 102 (FIG. 1) releases the lever 103 which is rocked clockwise by a spring 114 urging the slide 18 rearwards. The slide 18 thus releases the roller 16, whereupon the actuator 15 is raised by the spring 19 until arrested by the universal bail 11 in a so called zero position comparable with the zero position of the actuators 9 shown in FIG. 1.

Upon being driven by the main shaft 29 substantially at the beginning of the machine cycle the cam 28 (FIG. 3) rocks the bail 25 clockwise about the pivot 32 thus causing the pinion 23 to roll along the rack 38 an extent corresponding to a half-step of the pinion 23, whereby the pinion 23 is accordingly rotated clockwise about the pivot 123. Thereupon the cam 37 of the main shaft 29 releases the bail 34 which is rocked counterclockwise by the spring 27, whereby the pinion 23 will be disengaged from the stationary rack 38 and will mesh with the toothed edge 22 of the actuator 15.

The universal bar 11 is now raised by the cycling mechanism of the machine, thus enabling the actuators 9 and 15 to be moved upwards until arrested by the set stop pins 8. The denominational actuators 9 will thus sense the corresponding denominations of the pin carriage 7, whereas the cycle counter actuator 15 will sense the lowest set denomination thereof now occupying the position of rest of the first settable denomination of said pin carriage. Therefore, the actuator 15 during its upward movement will set the cycle counting device according to the digit set in said lowest denomination by correspondingly rotating the pinion 23 counterclockwise from the home or zero position shown in the drawings to a rotated position according to the digit sensed by the actuator 15, said digit being the first multiplier digit.

Upon so rotating the pinion 23 its tooth 31 releases the projection 39 of the lever 40 (FIG. 4) which is thus rocked clockwise by a spring 116. Since the lever 44 has already been rocked counterclockwise by the cam 46 the hooked arm 42 will latch the lug 43 and the lever 44 in its rocked position, thus preventing the pawl 47 from being restored. Consequently, the lever 44 is prevented from being rocked by the cam 46 the second time during the first multiplication machine cycle and during the following machine cycle as long as the pinion 23 stays in a rotated position, thus enabling the cycling mechanism to be operated through a variable number of machine cycles, said number resulting equal to the multiplier digit, as will be seen hereinafter.

When the universal bar 11 reaches its upper position the printing mechanism will cause the printing members associated with the actuators 9, 14 and 15 to print in a single line the multiplicand, a multiplier symbol like "×" and the lowest denominational digit of the multiplier. Thereupon the printing mechanism will be now disabled by the shoulder 76 of the lever 72, whereby in the following machine cycles effected for said multiplier digit the multiplicand will be prevented from being repeatedly printed.

The cam 37 now rocks the bail 34 clockwise and disengages the pinion 23 from the actuator 15. Since the lug 105 of the lever 103 previously rocked clockwise as above will condition the register engaging mechanism to mesh the register 13 with the actuators 9, upon restoration of the universal bar 11 and thus of the actuators 9 and 15 to their lower position the actuators 9 will enter the multiplicand into the register 13.

It should be noted, however, that if the multiplier digit sensed by the actuator 15 is a zero digit the roller 16 does not leave the slot 17, whereby the slide 18 may be shifted leftwards but partially. The lever 103 is thus rocked but partially, whereby the lug 105 is incapable of conditioning the register 13 to be meshed with the actuators 9, whereby the machine cycle will be a non-add cycle.

Assuming now the actuator 15 has sensed a non-zero multiplier digit, upon restoring the actuator to its zero position the roller 16 will engage the upper edge 115 of the slide 18 which has been fully shifted leftwards. The slide 18 is thus lowered and the lug 109 will release the locking lever 106, thus enabling same to be rocked clockwise by the spring 108 to engage the shoulder 111 of the actuator 15 by means of the lug 110. Therefore, the actuator 15 will now remain locked in its zero position through the following machine cycles effected for the sensed multiplier digit, as will be seen hereinafter.

In the final portion of the first multiplication machine cycle the cam 96 (FIG. 5) of the main shaft 29 will further rock the bail 95 counterclockwise (FIG. 6). The back space pawl 90 will now shift the pin carriage 7 such an additional extent rightwards as to bring the stop pin 8 first sensed by the actuator 15 in front of the zeroizing plate 21 (FIG. 2) to be thereupon reset thereby, thus zeroizing the set multiplier digit. Thereupon the pin 87 of the cam 88 will rock the lever 85 clockwise, thus lowering the back space pawl 90 in order to release the pin carriage 7 which is restored by the conventional carriage spring to the position assumed before being shifted said additional extent. The link 81 in turn is restored to the position shown in FIG. 5, whereby in the following multiplication machine cycles the back spacing pawl remains disabled.

It has been disclosed above how the cycle counting pinion 23 is set to a counterclockwise rotated position according to the sensed multiplier digit. The stepwise return movement to zero will be now described first assuming the actuator 15 is held stationary, as in the case of the multiplication cycles, the actuator 15 having been locked by the lug 110.

As mentioned above, at the beginning of each machine cycle the cam 28 of the main shaft 29 will rock the bail 25 clockwise about the pivot 32, thus causing the pinion 23 to clockwise roll along the rack 38 an extent corresponding to a half-step of the pinion 23. Thereupon the cam 37 enables the bail 34 to rock counterclockwise, whereby the pinion 23 will be disengaged from the rack 38 and will mesh with the actuator 15 during the upward movement of the universal bar 11.

During said upward movement the cam 28 enables the bail 25 to be restored by the spring 27, the pinion 23 thus clockwise rolling along the toothed edge 22 through another half-step. Finally, before the downward return movement of the universal bar 11 the cam 37 disengages the pinion 23 from the actuator 15 and reengages same with the rack 38. It will thus be apparent that the combined action of the cams 28 and 37 causes the pivot 123 of the pinion 23 to be first shifted downwards, then rightwards, then upwards and, finally leftwards. Therefore, the pinion 23 will be moved through a closed, substantially rectangular path to be alternately engaged with the two actuators 38 and 22 and to be enabled to clockwise roll along either actuator an extent corresponding to a half-step of the pinion, whereby the pinion 23 will be cyclically restored step by step.

It may be understood that in the first multiplication cycle, since the pinion 23 is simultaneously rotated counterclockwise during the differential upward movement of the actuator 15 and restored clockwise one step due to its above described rolling movement, the pinion 23 will finally effect a rotation corresponding to the difference between said differential movement and said one step restoration, whereby said first cycle will automatically be counted by the pinion itself.

In the last multiplication cycle effected for the sensed multiplier digit the pinion 23 is restored to its home or zero position shown in the drawings. The tooth 31 now engages the projection 39 to rock the lever 40 counterclockwise, thus releasing the lug 43 and enabling the lever 44 to immediately contact the cam 46. At the end of said last cycle the cam 46 will rock the lever 44 counterclockwise, causing the pawl 47 to engage the next juxtaposed pin 51 and to rotate the disk 52 through a further extent of 90 degrees. The shaft 53 is thus rotated through 180 degrees for each multiplier digit, whereby all its cams are formed with two identical cam surfaces which will operate the corresponding cam followers twice during each revolution of the shaft 53.

Upon the second rotation of the shaft 53 through 90 degrees, the cam 97 (FIG. 1) will rotate the lever 98 clockwise, thus causing the push rod 100 to set up a zero stop pin 8′ and a spacing stop pin 101 in the carriage denomination previously representing the first multiplier digit, and to operate the carriage escapement mechanism, whereby the multiplicand stored in the pin carriage 7 is shifted one denomination towards the higher orders and the pin carriage 7 is ready for having the next lowest denominational multipler digit set up therein.

The cam 102 in turn through the lever 103 will restore the slide 18, whose cam slot 17 will engage the roller 16 and lower the actuator 15 from its zero to its sub-zero position, whereas the lug 109 will disable the locking lever 106.

The cam 73 (FIG. 4) rocks the lever 72 counterclockwise, thus enabling the lug 71 to rock the lever 61 clockwise in order to release both the lug 59 of the lever 49 and the lug 69 of the crank lever 70 even if the key 65 is kept depressed after the end of the last multiplication cycle, whereby all the mechanism may now be restored and cycling mechanism is stopped.

The next lowest denominational multiplier digit may now be set up on the pin carriage 7 and by depressing in turn the key 65 a similar sequence of machine cycles is started, whereby the multiplicand initially set up may be multiplied by a multidigit multiplier. It is understood that the multiplication operation itself is not concerned by the present invention and that the product of the multiplication may be printed as usual in a total taking cycle clearing the register.

The described mechanism may also be operated by a second key 117 adapted to shift the slide 62 like the key 65 and further adapted to condition the register 13 to subtractively engage the denominational actuators 9 in order to effect a negative multiplication.

When the machine is operated for operations other than multiplication, the pawl 47 is not conditioned to rotate the shaft 53. Consequently, the pin carriage 7 is not back spaced after having set up an amount therein and the differential actuators 9 will sense the whole amount so set. Furthermore, the cycle counter actuator 15 remains locked by the cam slot 17 in its sub-zero position of FIG. 1. Since the pinion 23 is in its home position its step by step clockwise rotation is prevented by the lug 30 of the bail 25 arresting the tooth 31. More particularly, first the clockwise rolling movement along the rack 38 is effected as usual. When thereupon the pinion engages the actuator 15 the upward movement along same is prevented by the lug 30, whereby upon reengaging the rack 38 the pinion 23 will counterclockwise roll upwards along the rack 38 instead of clockwise rolling upwards along the actuator 15, whereby the final position of the pinion 23 will remain unchanged.

It will be understood that many changes and improvements in the form and details of the mechanism illustrated and in its operation may be made by those skilled in the art without departing from the spirit of the invention. For example, instead of a multiplication key to be depressed after having set up each denominational digit of the multiplier, means may be provided to be operated upon having set up the multiplicand for conditioning all the numerical keys of the keyboard to directly start the multiplication mechanism, for example by enabling the usual key conditioned escapement operating universal member to shift the slide 62 forwards.

Furthermore a device may be provided to prevent the multiplicand from being printed on the paper together with the multiplier denominational digits following the lowest denominational digit. At last, a device may be provided to prevent more than one multiplier digit at a time from being set up in the pin carriage.

What we claim is:

1. In an adding machine comprising a cycling mechanism operable through a variable number of machine cycles, a multidenominational indexing mechanism settable according to a multidigit amount, a plurality of denominational actuators adapted to cooperate with the set denominations of said indexing mechanism for an amount entering operation, and back spacing means operable for shifting the cooperative relationship of said plurality of actuators and said indexing mechanism one denomination toward the lower denominations of said plurality, the combination of a cycle counter cooperating with said indexing mechanism and settable under the control thereof according to the lowest denominational digit of said amount, and means for operating said back spacing means and for causing said cycle counter to be thereupon so set, said digit being a multiplier digit, the other digits of said amount representing a multiplicand.

2. In an adding machine comprising a cycling mechanism operable through a variable number of machine cycles, a multidenominational indexing mechanism denominationally settable according to a multidigit amount beginning from the highest denominational digit of said amount, a plurality of denominational actuators adapted to cooperate with the set denominations of said indexing mechanism for an amount entering operation, and back spacing means operable for shifting the cooperative relationship of said plurality of actuators and said indexing mechanism one denomination toward the lower denominations of said plurality, the combination of a cycle counter cooperating with said indexing mechanism and settable under the control thereof according to the digit of the lowest denomination of said amount, and manipulative means for operating said back spacing means to restore the cooperative relationship established after all the denominations of said amount but the lowest had been set up and for causing said cycle counter to be thereupon so set, said lowest denomination representing a multiplier digit, the other denominations of said amount representing a multiplicand.

3. In an adding machine comprising a cycling mechanism operable through a variable number of machine cycles, a multidenominational indexing mechanism settable to represent a multidigit amount, a plurality of denominational actuators adapted to sense the set denominations of said indexing mechanism for an amount entering operation, and back spacing means operable for shifting the sensing relationship of said plurality of actuators and said indexing mechanism one denomination toward the lower denominations of said plurality, the combination of a cycle counter settable according to a digit sensed in the lowest set denomination of said indexing mechanism, and manipulative means for operating said back spacing means and for causing said cycle counter to thereupon sense said lowest denomination, the lowest set denomination of said indexing mechanism representing a multiplier digit, the higher set denominations representing a multiplicand.

4. In an adding machine comprising a cycling mechanism operable through a variable number of machine cycles, a multidenominational indexing mechanism settable according to a multidigit amount, a plurality of denominational actuators adapted to cooperate with the set denominations of said indexing mechanism for an amount entering operation, and back spacing means operable for shifting the cooperative relationship of said plurality of actuators and said indexing mechanism one denomination toward the lower denominations of said plurality, the combination of a cycle counter actuator adapted to cooperate with the lowest set denomination of said indexing mechanism, a cycle counting device settable by said cycle counter actuator according to the digit set in said lowest denomination, and manipulative means for operating said back spacing means and thereupon causing said actuator to so set said counting device, said digit being a multiplier digit, the other digits of said amount representing a multiplicand.

5. In an adding machine comprising a cycling mechanism operable through a variable number of machine cycles, a traveling multidenominational indexing mechanism denominationally settable according to a multidigit amount, and a plurality of denominational actuators adapted to sense the set denominations of said indexing mechanism for an amount entering operation during a machine cycle, the combination of a back spacing mechanism conditionable to be operated by said cycling mechanism for shifting said indexing mechanism one step backwards substantially at the beginning of a machine cycle, a cycle counter actuator mounted substantially in correspondence with the first settable denomination of said indexing mechanism and operable to be set according to the digit sensed therein, means for initiating a multiplication operation, said means comprising means for starting said cycling mechanism for a multicycle operation, means for conditioning said back spacing mechanism for operation and for operating said cycle counter actuator in the first cycle of said multicycle operation, said digit being a multiplier digit, the other digits of said amount representing a multidenominational multiplicand, and means controlled in the last cycle of said multicycle operation for setting a zero digit in said indexing mechanism and returning said indexing mechanisms to the original position assumed before operation of said back spacing mechanism.

6. In an adding machine comprising a cycling mechanism operable through a variable number of machine cycles, a multidenominational indexing mechanism settable according to a multidigit amount, a plurality of denominational actuators adapted to cooperate with the set denominations of said indexing mechanism for an amount entering operation, back spacing means operable for shifting the cooperative relationship of said plurality of actuators and said indexing mechanism one denomination toward the lower denominations of said plurality, a plurality of digit printing members associated with said denominational actuators, and a symbol printing member mounted on the right side of said plurality of printing members, the combination of a cycle counter actuator settable according to the lowest denominational digit of said amount, means for operating said back spacing means and for causing said actuator to be thereupon so set, said digit being a multiplier digit, the other digits of said amount being a multiplicand, a multiplier digit printing member associated with said cycle counter actuator and mounted on the right side of said symbol printing member, and means for operating all said printing members so as to print a multiplication symbol between the multiplicand digits and the multiplier digit.

7. In an adding machine having a cycling mechanism operable through a variable number of machine cycles, a cycle counting pinion settable from a home position to a rotated position according to a multiplier digit, means operable by said cycling mechanism for cyclically moving said pinion bodily through a closed path, a pair of stationary actuators diametrically opposed with respect to said pinion and adapted to be alternately engaged thereby during said movement to step by step restore said pinion to said home position one unit for each cycle.

8. In an adding machine having a cycling mechanism operable through a variable number of machine cycles, a cycle counting pinion settable from a home position to a rotated position according to a multiplier digit, a pair of stationary actuators diametrically opposed with respect to said pinion, a first element operable by said cycling mechanism for causing said pinion to alternately engage said actuators, and a second element operable by said cycling mechanism for causing said pinion when engaging either actuator to roll along same an extent corresponding to a half-step of said pinion, whereby said pinion is cyclically stepwise restored to said home position.

9. In adding machine having a cycling mechanism operable through a variable number of machine cycles, a cycle counting pinion settable from a home position to a rotated position according to a multiplier digit, a cycle counter actuator differentially reciprocable for setting said pinion substantially at the beginning of a multiplication operation, a locking member for locking said actuator after said differential reciprocation, a stationary actuator diametrically opposed to said cycle counter actuator with respect to said pinion, a first cam element operable by said cycling mechanism for causing said pinion to alternately engage said actuators, and a second cam element operable by said cycling mechanism for causing said pinion when engaging either actuator to roll along same an extent corresponding to a half-step of said pinion, whereby said pinion is cyclically stepwise restored to said home position.

10. In an adding machine having a cycling mechanism operable through a variable number of machine cycles, a cycle counting pinion settable from a zero position to a rotated position according to a multiplier digit, a cycle counter actuator differentially movable for setting said pinion, a first element operable by said cycling mechanism for causing said pinion to engage said actuator during said differential movement, and a second element operable by said cycling mechanism for causing said pinion during said engagement to roll along said actuator in such a direction as to be restored one step to said zero position, whereby said pinion will effect a rotation corresponding to the difference between said differential movement and said one step restoration.

11. In an adding machine having a cycling mechanism operable through a variable number of machine cycles, a cycle counting pinion settable in a predetermined position from a zero position to a rotated position according to a multiplier digit, a zero cam element on said pinion, a pivot for said pinion, a pair of opposed stationary members, means resiliently operable by said cycling mechanism for normally moving said pivot according to a closed path, said pivot when so moved causing said pinion to alternately engage said members and when engaging either member to roll along same an extent corresponding to a half-step of said pinion to be cyclically stepwise restored to said zero position in a direction opposed to said predetermined direction, and a stop element bodily movable with said pivot for arresting said zero cam element when said pinion is in zero position to prevent said pinion from being rotated in said opposed direction.

12. In an adding machine having a cycling mechanism operable through a variable number of machine cycles, a cycle counting device settable from a zero position to a set position according to a multiplier digit, a cycle counter actuator removable from a position of rest for setting said device and adapted to be returned thereto, a locking member for normally locking said actuator in said position of rest, said locking member being shiftable in one direction for releasing said actuator to enable same to set said device, an element on said actuator adapted to shift said locking member in a second direction upon being returned to said position of rest, a normally ineffective second locking member for said actuator, and means controlled by said first locking member upon being shifted in said second direction for enabling said second locking member to lock said actuator substantially in said position of rest.

13. In an adding machine as defined in claim 12, means for returning said counting device to its zero position, and means conditioned by said counting device when returned to zero position for enabling said first locking member to relock said actuator and for enabling said controlled means to disable said second locking member.

References Cited in the file of this patent

UNITED STATES PATENTS 2,102,700 Gustafsson et al. -------- Dec. 21, 1937